United States Patent
Guillot et al.

(10) Patent No.: US 8,401,190 B2
(45) Date of Patent: Mar. 19, 2013

(54) PORTABLE SECURITY MODULE PAIRING

(75) Inventors: Philippe Guillot, Bruz (FR); Laurent Albanèse, Paris (FR)

(73) Assignee: Nagra France SAS, Paris (FR)

( * ) Notice: Subject to any disclaimer, the term of this patent is extended or adjusted under 35 U.S.C. 154(b) by 996 days.

(21) Appl. No.: 10/573,367

(22) PCT Filed: Oct. 5, 2004

(86) PCT No.: PCT/EP2004/052445
§ 371 (c)(1),
(2), (4) Date: Feb. 23, 2007

(87) PCT Pub. No.: WO2005/034514
PCT Pub. Date: Apr. 14, 2005

(65) Prior Publication Data
US 2007/0253551 A1    Nov. 1, 2007

(30) Foreign Application Priority Data
Oct. 6, 2003 (EP) .................................. 03292459

(51) Int. Cl.
*H04N 7/167* (2011.01)

(52) U.S. Cl. ........ 380/241; 380/227; 380/228; 380/229; 380/230; 380/231; 380/232; 380/233; 380/234; 380/239; 380/240; 380/242; 705/51; 705/52; 705/55; 705/58

(58) Field of Classification Search .......... 380/227–234, 380/239–242; 705/51, 52, 55, 58
See application file for complete search history.

(56) References Cited

U.S. PATENT DOCUMENTS

| | | | |
|---|---|---|---|
| 6,286,103 B1 * | 9/2001 | Maillard et al. | 726/26 |
| 2001/0002486 A1 * | 5/2001 | Kocher et al. | 713/171 |
| 2003/0177348 A1 * | 9/2003 | Davies et al. | 713/153 |
| 2004/0017918 A1 * | 1/2004 | Nicolas | 380/279 |
| 2004/0264700 A1 * | 12/2004 | Kirkland | 380/270 |
| 2006/0107045 A1 * | 5/2006 | Le Buhan et al. | 713/168 |

FOREIGN PATENT DOCUMENTS

| | | |
|---|---|---|
| EP | 0 658 054 | 6/1995 |
| WO | WO-91/11884 | 8/1991 |

(Continued)

OTHER PUBLICATIONS

International Search Report for PCT/EP2004/052445 dated Feb. 3, 2005 (3 pages).

(Continued)

*Primary Examiner* — Christian Laforgia
*Assistant Examiner* — Roderick Tolentino
(74) *Attorney, Agent, or Firm* — Osha Liang LLP

(57) ABSTRACT

A method for pairing a first element and a second element, wherein the first element and the second element form a first decoding system among a plurality of receiving decoding systems in a broadcasting network. Each receiving decoding system is adapted to descramble scrambled audiovisual information received over the broadcasting network. A first key unique in the broadcasting network is selected. A second key is determined according to the first key, such that a combination of the first key and the second key enables to decrypt broadcasted encrypted control data that is received to be decrypted by each receiving decoding system, the encrypted control data being identical for each receiving decoding system. The first key and the second key are assigned respectively to the first element and the second element.

17 Claims, 6 Drawing Sheets

FOREIGN PATENT DOCUMENTS

| WO | WO-99/18729 | 4/1999 |
|----|-------------|--------|
| WO | WO-99/43120 | 8/1999 |

OTHER PUBLICATIONS

"Public-Key Encryption Press Series on Discrete Mathematices and Its Applications" Handbook of Applied Cryptography Author: Menezes A et al. Boca Raton, FL CRC Press, U.S. 1997 (8 pages).

"Threshold Cryptography" European Transactions on Telecommunications and Realted Technologies, AEI Milano, Italy Author: Desmedt Y G vol. 5, No. 4, dated Jul. 1, 1994 (9 pages).

"Efficient Generation of Shared RSA Keys" Advances in Cryptology—Crypto '97 Proceedings of the Annual International Cryptology Conference (CRYPTO) Santa Barbara Aug. 17-21, 1997 Author: Boneh D et al. Berlin, Springer, DE vol. Conf. 17 XP-000767548 (15 pages).

* cited by examiner

PORTABLE SECURITY MODULE PAIRING

BACKGROUND OF INVENTION

1. Field of the Invention

The invention relates to a method for pairing a decoder and a portable security module, the decoder and the portable security module being adapted to descramble scrambled audiovisual information.

2. Background Art

Transmission of encrypted data is well-known in the field of pay TV systems, where scrambled audiovisual information is usually broadcast by terrestrial emitters, satellite or through a cable network to a number of subscribers, each subscriber possessing a decoder or receiver/decoder capable of descrambling the scrambled audiovisual information for subsequent viewing.

In a typical system, the scrambled audiovisual information may be descrambled using a control word. In order to try to improve the security of the system, the control word is usually changed every ten seconds or so. Every 10 seconds, each subscriber receives, in an ECM (Entitlement Control Message), the control word necessary to descramble the scrambled audiovisual information so as to permit viewing of the transmission.

The control word itself is encrypted by an exploitation key and transmitted in encrypted form in the ECM. The scrambled audiovisual information and the encrypted control word are received by a decoder, which in the case of a paid-up subscriber, has access to the exploitation key stored on a portable security module, e.g., a smart card, inserted in the decoder. The encrypted control word is decrypted using the exploitation key by the smartcard. The smartcard transmits the control word to the decoder. The scrambled audiovisual information is descrambled using the decrypted control word by the decoder. The decoder is indeed powerful enough to provide a real-time descrambling of the scrambled audiovisual information.

The exploitation key is itself periodically changed, e.g. every month or so. An EMM (Entitlement Management Message) is monthly received by the decoder and is transmitted in the smartcard. The EMM contains the exploitation key in an encoded form. A group key assigned to the smartcard enables to decode the encoded exploitation key.

The group key may be assigned to the smartcard or to a group of smartcards. An EMM destined to a determined group of smartcards comprises an exploitation key encoded with the corresponding group key and a group number assigned to the determined group.

Each decoder receives monthly a plurality of EMM. For each received EMM, the decoder compares the group number of the received EMM to the group number of the group to which the smartcard inserted in the decoder belongs. If they are equal, the decoder transmits the EMM to the smartcard and the exploitation key contained in the EMM is decoded.

With such a system, the smartcard may be used with any decoder. A subscriber may for example lend his smartcard to another person. It may be necessary to introduce restrictions in the system by restricting the possibility to use the smartcard with any decoder. One way of restricting is known as pairing. Pairing means are provided to ensure that a determined smartcard corresponds to a determined decoder and will not operate with any other decoder.

Typically, a first number and a second number are downloaded both into the decoder and the smartcard at a beginning of a subscription. An authenticating test is periodically performed by the decoder and the smartcard. The decoder periodically requests and receives from the smartcard a value of a second number stored into the smartcard. The decoder checks that the received value of the second number is similar to the downloaded second number. A decision is made according to a result of the authenticating test. If the received value of the second number is different from the downloaded second number, the scrambled audiovisual information is not descrambled. Similarly, the smartcard periodically requests and receives from the decoder a value of a first number stored into the decoder. The smartcard checks that the received value of the first number is similar to the downloaded first number.

In the event that a defrauder manages to override the decision that is made according to the result of the test, e.g. the scrambled audiovisual information is descrambled even if the received value of the second number is different from the downloaded second number, the pairing is rendered inactive.

A more robust pairing method may be implemented. A determined pairing key is assigned to a determined decoding system, the decoding system comprising a decoder and a smartcard. The pairing key is downloaded into the decoder and into the smartcard at a beginning of a subscription. The decoder and the smartcard communicate with each other using the pairing key. Every 10 seconds, the smartcard encodes the decrypted control word using a smartcard pairing key stored into the smartcard. The smartcard transmits the encoded control word to the decoder. If a decoder pairing key stored into the decoder is different from the pairing key of the decoding system or if the smartcard pairing key is different from the pairing key, the decoder is not able to decode the encoded control word and the scrambled information data are not descrambled. This pairing system also enables to avoid that a person reads the control word when transmitted from the smartcard to the decoder.

However, it is relatively easy to access the decoder pairing key. Hence the pairing key of the decoding system may become pirated and the smartcard made to operate with another decoder.

A third pairing method is described in European Patent EP 466916 and is illustrated in FIG. 1. An encrypting system 101 comprises a scrambler (not represented) to scramble an audiovisual information (not represented) with a key 104. A first key encryptor 105 encrypts the key 104 using a first secret serial number $SSN0_i$ stored in a SSN0 database 106. The key 104 is further encrypted in a second key encryptor 107 using a second secret serial number $SSN1_i$ stored in a SSN1 database 108. This produces a series of twice-encrypted keys $(114_1, \ldots, 114_i, \ldots, 114_n)$ which are then transmitted along with the scrambled audiovisual information. A decoding system $109_i$ among a plurality of receiving decoding systems $(109_1, \ldots, 109_i, \ldots, 109_n)$ of a broadcasting network receives the scrambled audiovisual information and one of the twice-encrypted key from the series of twice-encrypted keys.

Each receiving decoding system $(109_1, \ldots, 109_i, \ldots, 109_n)$ comprises a decoder $(112_1, \ldots, 112_i, \ldots, 112_n)$ and a portable security module $(111_1, \ldots, 111_i, \ldots, 111_n)$. Each decoder $(112_1, \ldots, 112_i, \ldots, 112_n)$ contains a SSN0 memory $(113_1, \ldots, 113_i, \ldots, 113_n)$ comprising a first secret serial number $(SSN0_1, \ldots, SSN0_i, \ldots, SSN0_n)$. The first secret serial number $(SSN0_1, \ldots, SSN0_i, \ldots, SSN0_n)$ is unique for each decoder or for a group of decoders. Each portable security module $(111_1, \ldots, 111_i, \ldots, 111_n)$ contains a SSN1 memory $(110_1, \ldots, 110_i, \ldots, 110_n)$ comprising a second secret serial number $(SSN1_1, \ldots, SSN1_i, \ldots, SSN1_n)$. The second secret serial number $(SSN1_1, \ldots, SSN1_i, \ldots, SSN1_n)$ is unique for each portable security module or for a group of portable security modules.

The decoding system $109_i$ performs a first key decryption in a portable security module $111_i$. The portable security module $111_i$ performs a first key decryption using the second secret serial number $SSN1_i$ and outputs a partially decrypted key. The partially decrypted key is transmitted to a decoder $112_i$. The key is fully decrypted using the first secret serial number $SSN0_i$ stored in SSN0 memory $113_i$. The fully decrypted key is used to descramble the scrambled audiovisual information.

The third pairing method provides a robust pairing since the second secret serial key $SSN1_i$ is stored into the portable security module $110_i$ and is thus rendered difficult to read.

SUMMARY OF INVENTION

In a first aspect, the invention provides a method for pairing a first element and a second element. The first element and the second element form a first decoding system among a plurality of receiving decoding systems in a broadcasting network, each receiving decoding system being adapted to descramble scrambled audiovisual information received over the broadcasting network. The method comprises selecting a first key, the first key being unique in the broadcasting network, and determining a second key according to the first key, such that a combination of the first key and the second key enables to decrypt broadcasted encrypted control data that is received to be decrypted by each receiving decoding system, the encrypted control data being identical for each receiving decoding system. The first key and the second key are respectively assigned to the first element and the second element.

In a first preferred embodiment, the control data enables to descramble the scrambled audiovisual information. Furthermore, the method further comprises receiving at the first decoding system the encrypted control data, and using the first key at the first element and using the second key at the second element to decrypt the encrypted control data.

In a second preferred embodiment, the control data is a control word, and the audiovisual information is scrambled using the control word.

In a third preferred embodiment, the control data is an Entitlement Control Message (ECM) comprising a control word. The audiovisual information is scrambled using the control word.

In a fourth preferred embodiment, the control data is an exploitation key. The exploitation key enables to decode a control word, and the audiovisual information is scrambled using the control word.

In a fifth preferred embodiment, the control data is an Entitlement Management Message (EMM) comprising an exploitation key enabling to decode a control word. The audiovisual information is scrambled using the control word.

In a sixth preferred embodiment, the encrypted control data is decrypted using a RSA algorithm. A first prime number p and a second prime number q are selected, and a modulus number n calculated as being equal to a product of the first prime number p and the second prime number q. An encrypting key e is selected as being smaller to the modulus number and as being prime with a function of the first prime number p and the second prime number q. A private key is determined as being equal to an inverse of the encrypting key modulus the function of the first prime number p and the second prime number q. The first key and the second key are selected such that a product of the first key and the second key equals the private key modulo the function of the first prime number p and the second prime number q. The first prime number p and the second prime number q are erased.

In a seventh preferred embodiment, the method further comprises receiving at each receiving decoding system a message comprising the encrypted control data, and decrypting the encrypted control data using the first key at the first element and the second key at the second element.

In an eight preferred embodiment, the encrypted control data is decrypted using a discrete logarithms algorithm. The method further comprises selecting a prime number q, selecting a primitive root of the prime number g; wherein a product of the first key and the second key equals a private key modulo the prime number.

In a ninth preferred embodiment, the method further comprises receiving at each receiving decoding system a message comprising an encrypted information encrypted with a cession key, the message also comprising the primitive root of the prime number g power a random number k. The first key is used at the first element and the second key is used at the second element to calculate the cession key from the prime number power the random number k. The encrypted information is decrypted using the cession key.

In a tenth preferred embodiment, the encrypted information is the scrambled audiovisual information.

In an eleventh preferred embodiment, the encrypted information is a control word, the audiovisual information being scrambled using the control word.

In a twelfth preferred embodiment, the method further comprises respectively attributing the first key and the second key at least to a third element and a fourth element, the third element and the fourth element forming a second decoding system distinct from the first decoding system.

In a thirteenth preferred embodiment, the first element is a decoder; and the second element is a portable security module.

In a second aspect the invention provides a first decoding system among a plurality of receiving decoding systems in a broadcasting network, each receiving decoding system being adapted to descramable scrambled audiovisual information received over the broadcasting network. The first decoding system comprises a first element to which is assigned a first key, the first key being unique in the broadcasting network, and a second element to which is assigned a second key, the second key being determined according to the first key such that a combination of the first key and the second key enables to decrypt broadcasted encrypted control data that is received to be decrypted by each receiving decoding system, the encrypted control data being identical for each receiving decoding system.

In a fourteenth preferred embodiment, the first decoding system further comprises receiving means to receive the broadcasted encrypted control data, and a pair of decryptions comprising a first decryption and a second decryption respectively located in the first element and the second element, the pair of decryptions enabling to decrypt the broadcasted encrypted control data using the first key and the second key.

In a fifteenth preferred embodiment, the broadcasted encrypted control data is decrypted using a discrete logarithm algorithm.

In a sixteenth preferred embodiment, the broadcasted encrypted control data is decrypted using a RSA algorithm.

In a seventeenth preferred embodiment, the control data is a control word, the audiovisual information being scrambled using the control word.

In an eighteenth preferred embodiment, the control data is an exploitation key, the exploitation key enabling to decode a control word, the audiovisual information being scrambled using the control word.

In a nineteenth preferred embodiment, the first element is a decoder, and the second element is a portable security module.

In a third aspect, the invention provides an apparatus for pairing a first element and a second element, the first element and the second element forming a first decoding system among a plurality of receiving decoding systems in a broadcasting network, each receiving decoding system being adapted to descramble scrambled audiovisual information received over the broadcasting network. The apparatus comprises selecting means to select a first key, the first key being unique in the broadcasting network. Processing means determine a second key according to the first key such that a combination of the first key and the second key enables to decrypt broadcasted encrypted control data that is received at each receiving decoding system to be decrypted, the encrypted control data being identical for each receiving decoding system. Assigning means respectively assign the first key and the second key to the first element and to the second element.

Other aspects and advantages of the invention will be apparent from the following description and the appended claims.

DETAILED DESCRIPTION

The broadcasting network may comprise a high number of receiving decoding systems, typically several millions. The third pairing method requires the encoding system to transmit the series of twice-encrypted keys. Each twice-encrypted key is unique for a receiving decoding system or for a group of receiving decoding system. Hence a duration of the transmission of the series of twice-encrypted keys may be relatively long. The transmission of the series of twice-encrypted keys described in the third method occurs once a month only. There is a need for a method allowing to transmit a single encrypted key to the plurality of decoding systems of the broadcasting network, in order to provide a more frequent checking of the pairing.

Figure 1:
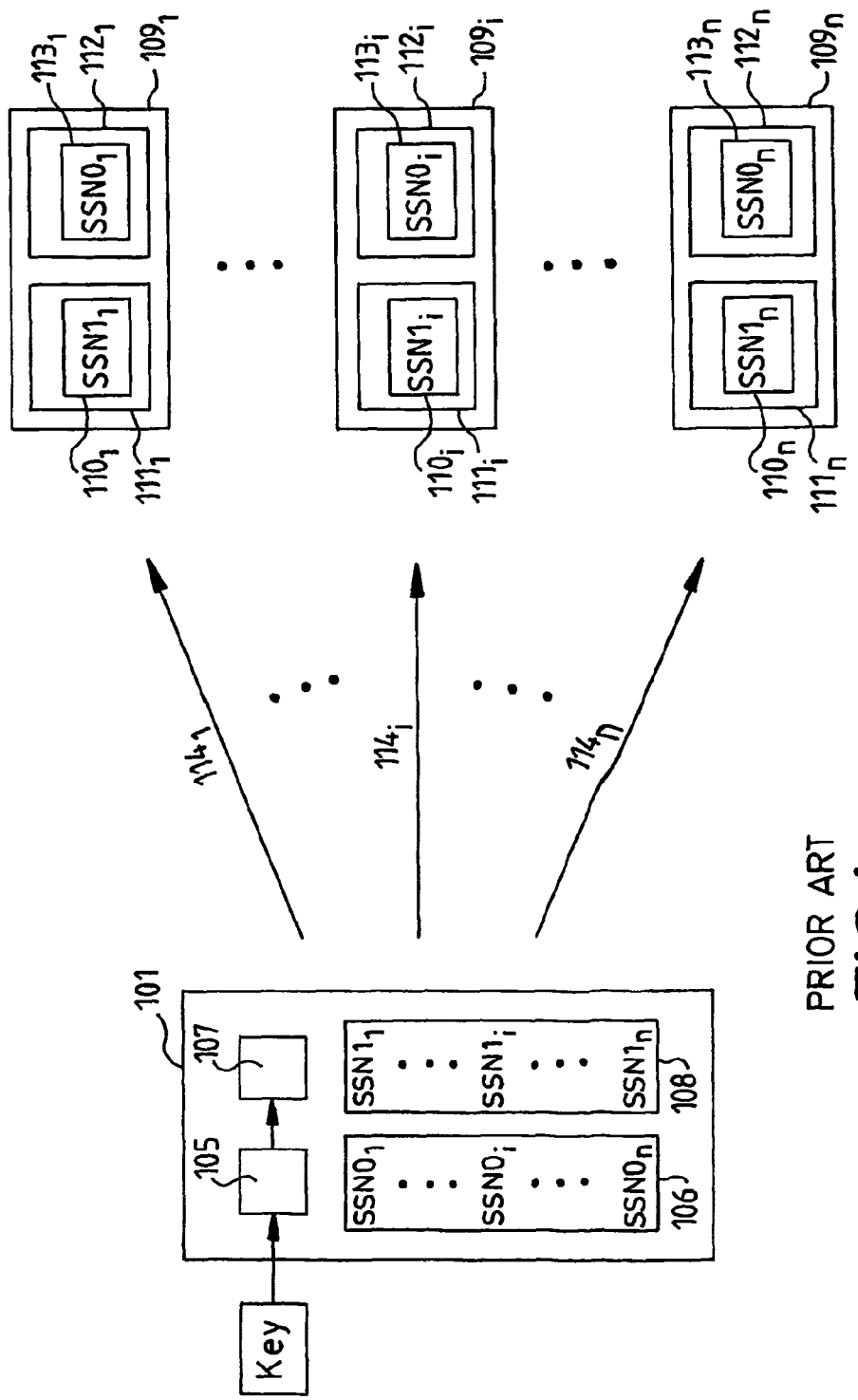
FIG. 1 contains a schematic diagram of a third pairing method from prior art.
Figure 2:
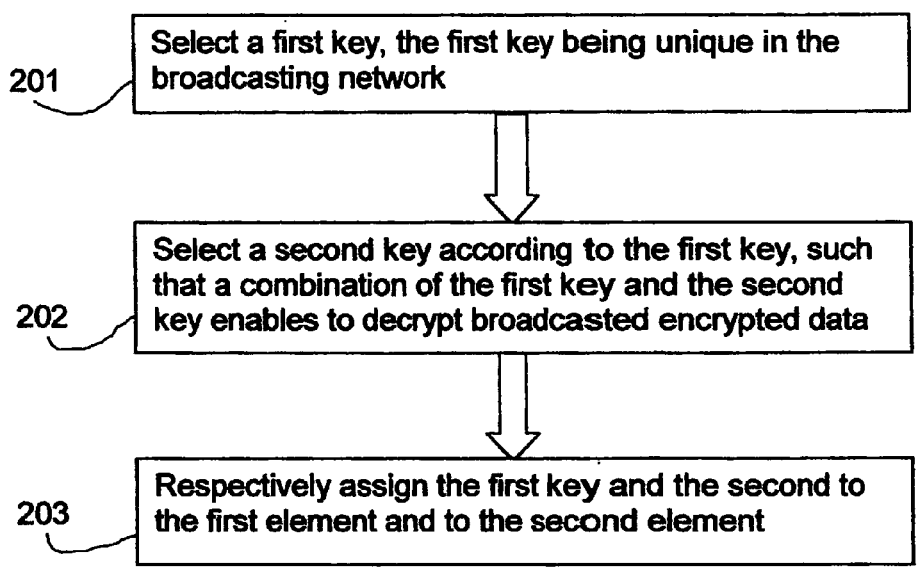
FIG. 2 shows a flowchart of a pairing method according to the invention.

FIG. 2 provides a flowchart of an example method for pairing a first element and a second element. The first element and the second element form a first decoding system among a plurality of receiving decoding systems in a broadcasting network. Each receiving decoding system is adapted to descramble scrambled audiovisual information received over the broadcasting network. A first key is selected 201. The first key is unique in the broadcasting network. A second key is determined 202 according to the first key such that a combination of the first key and the second key enables to decrypt broadcasted encrypted control data. The broadcasted encrypted control data is received to be decrypted by each receiving decoding system. The encrypted control data is identical for each receiving decoding system. The first key and the second key are assigned 203 respectively to the first element and to the second element. The first key and the second key may for example be stored respectively in a first secured memory of the first element and a second secured memory of the second element, the secured memories being protected from reading.

Figure 3:
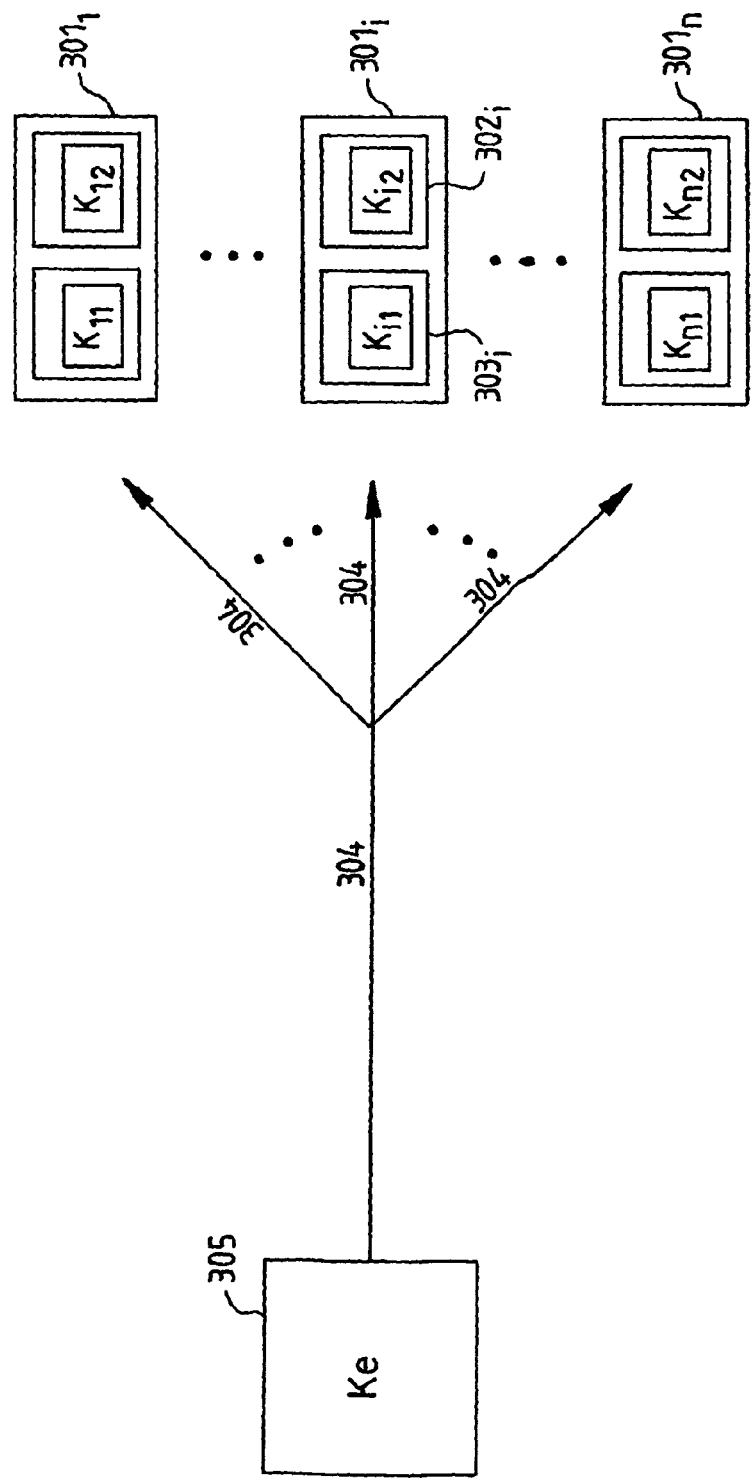
FIG. 3 contains a schematic diagram of a pairing method according to the invention.

FIG. 3 provides an illustration of a first decoding system $301_i$ according to the invention among a plurality of receiving decoding systems $(301_1, \ldots, 301_i, \ldots, 301_n)$. Each receiving decoding system is adapted to descramble scrambled audiovisual information. The first decoding system $301_i$ comprises a first element $302_i$ and a second element $303_i$.

The first element $302_i$ may be a portable security module, and the second element $303_i$ may be a decoder. The portable security module may for example be a smartcard.

A first key $K_{i1}$ is assigned to the decoder and a second key $K_{i2}$ is assigned to the smartcard. The first key $K_{i1}$ and the second key $K_{i2}$ form a pair of keys that is unique for the broadcasting network. Only one of the keys of the pair of keys may be randomly chosen. If the first key $K_{i1}$ is randomly chosen, the second key $K_{i2}$ is determined according to the first key $K_{i1}$ such that a combination of the first key $K_{i1}$ and the second key $K_{i2}$ enables to decrypt broadcasted encrypted control data 304.

The broadcasted encrypted control data 304 is intended to be decrypted by each receiving decoding system. The encrypted control data 304 is identical for each receiving decoding system $(301_1, \ldots, 301_i, \ldots, 301_n)$. Typically, a sum of the first key $K_{i1}$ and the second key $K_{i2}$, or a product of the first key $K_{i1}$ and the second key $K_{i2}$, is congruent to a pairing system key $K_{PS}$. The pairing system key $K_{PS}$ enables to decrypt the broadcasted encrypted control data 304. The control data are encrypted using a single encoding key $K_e$ at an encoding system 305.

If the broadcasted control data are encrypted and decrypted using an asymmetric cryptography algorithm, the pairing system key $K_{PS}$ may be a private key and the encoding key $K_e$ may be the corresponding public key. If the cryptography algorithm is symmetric, the pairing system key $K_{PS}$ and the encoding key $K_e$ may be identical.

In the third pairing method from prior art, a twice-encrypted key is transmitted for each pair of secret serial number $(SSN0_i, SSN1_i)$, i.e. for each receiving decoding system or for each group of receiving decoding systems. The encoding system has to transmit a series of twice-encrypted keys, which may be relatively long. The method according to the invention allows to transmit a single broadcasted encrypted data to the broadcasting network. For a single pairing system key $K_{PS}$ corresponding to a single encoding key $K_e$, a wide number of distinct pairs of keys $(K_{i1}, K_{i2})$ may indeed be provided such that the product of the first key $K_{i1}$ and the second key $K_{i2}$, is congruent to the pairing system key $K_{PS}$. The method according to the invention allows to test a pairing of each receiving system by transmitting a single broadcasted encrypted control data. The test of the pairing of each receiving system of the broadcasting network may be performed much more often than once a month, e.g. every 10 seconds, thus providing a more secure pairing.

The test of the pairing may be performed by transmitting to the broadcasting network an encrypted control data that is necessary for descrambling the scrambled audiovisual information. For example, the control data may be a control word, the control word directly allowing to descramble the scrambled audiovisual information.

The encrypted control data may also be an Entitlement Control Message (ECM) comprising the encrypted control word.

The control data may also be an exploitation key, the exploitation key allowing to decode an encoded control word. The scrambled audiovisual information may be descrambled using the control word.

The encrypted control data may also be an Entitlement Management Message (EMM) comprising the encrypted exploitation key.

The encrypted control data may also be the scrambled audiovisual information, that is directly descrambled using the first key and the second key. In this latter case, the portable security module may be relatively powerful so as to be able to provide a real-time decoding.

If the decoder and the smartcard are paired, the combination the first key $K_{i1}$ and the second key $K_{i2}$ is congruent to the pairing system key $K_{PS}$. The decoding system receives the control data, e.g. a control word, encrypted with the encoding key $K_e$. The control word is decrypted using the first key at the decoder and the second key at the smartcard. The control word enables to descramble the scrambled audiovisual information at the decoder.

If the decoder and the smartcard are not paired, the combination the first key $K_{i1}$ and the second key $K_{j2}$ is not congruent to the pairing system key $K_{PS}$. The decoding system is not able to decrypt correctly the encrypted control word and the scrambled audiovisual information is not descrambled.

Figure 4:
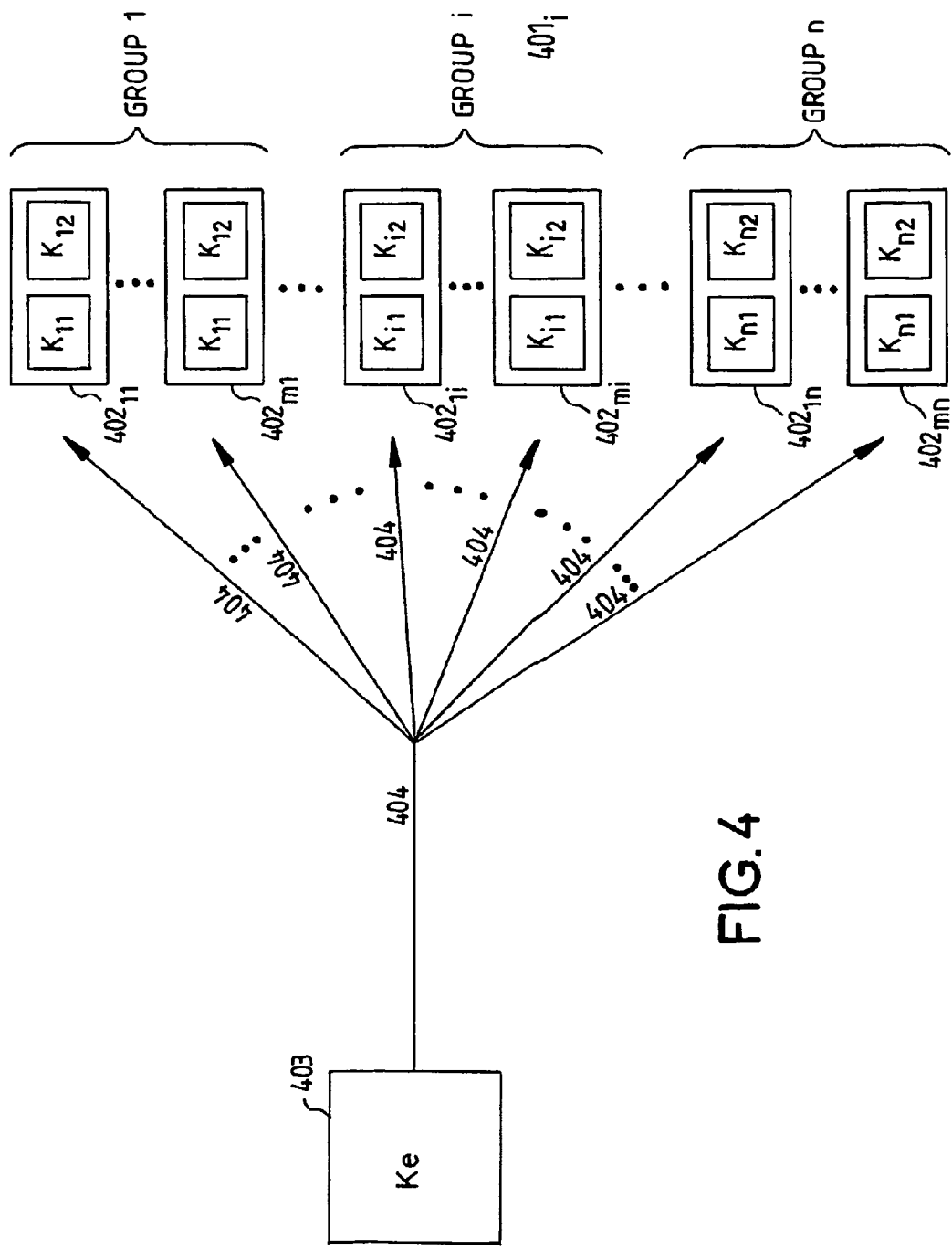
FIG. 4 contains a schematic diagram of a first embodiment of the present invention.

In a first embodiment, the pair of keys attached to the decoding system is attributed at least to a second receiving decoding system distinct from the first decoding system. FIG. 4 provides an illustration of the first embodiment. A "group" $401_i$ of decoding system ($402_{1i}, \ldots, 402_{mi}$) having a same pair of keys ($K_{i1}, K_{i2}$) may be defined among a plurality of groups ($401_1, \ldots, 401_i, \ldots, 401_n$) of receiving decoding systems ($402_{11}, \ldots, 402_{m1}, \ldots, 402_{1i}, \ldots, 402_{mi}, \ldots 402_{1n}, \ldots, 402_{mn}$). This embodiment may render the pairing easier to perform, but the pairing is tested the same way as described above. An encoding system 403 encrypt a control data, and the encrypted control data 404 is broadcasted over the network. Each receiving system ($402_{11}, \ldots, 402_{m1}, \ldots, 402_{1i}, \ldots, 402_{mi}, \ldots, 402_{1n}, \ldots, 402_{mn}$) of any group receives the broadcasted encrypted control data 404 and decrypt the control data using the first key and the second key. In this embodiment, a decoder from a determined group may operate with any smartcard of the determined group. Each group comprises a relatively low number of receiving decoding elements, so that a smartcard of a first person has a relatively low probability to be able to operate with a decoder of a second person.

In a second embodiment, the pairing is performed at a beginning of a subscription. An operator downloads the first key and the second key respectively into the decoder and the smartcard. The first key and the second key are protected from reading.

In a third embodiment, the first key and the second key are regularly replaced, e.g. once a month. A decoder group key G1 is attached to the decoder and a smartcard group key G2 may be attached to the smartcard. The decoder group key G1 and the smartcard group key G2 may be for example a serial number respectively attached to a single decoder and a single smartcard. The decoder group key G1 and the smartcard group key G2 may also be respectively attached to a group of decoders or to a group of smartcards. The decoder group key G1 and the smartcard group key G2 form a set of keys that is specific to the first decoding system or to a group of receiving decoding system.

The pairing is regularly performed: a first EMM and a second EMM are sent to the first decoding system. The decoder receives the first EMM and the second EMM, and transmits the second EMM to the smartcard. The first EMM contains the first key $d_1$ encoded with the decoder group key G1. The second EMM contains the second key $d_2$ encoded with the smartcard group key G2. The first key $d_1$ and the second key $d_2$ are selected such that the product of the first key $d_1$ and the second key $d_2$ is congruent to the pairing system key $K_{PS}$. The decoder decodes the first key $d_1$ with the decoder group key G1 and the smartcard decodes the second key $d_2$ with the smartcard group key G2.

The first key $d_1$ and the second key $d_2$ allow to decrypt broadcast encrypted control data, e.g. the control word encrypted with the encoding key. The encoding key $K_e$ and the pairing system key $K_{PS}$ may also be changed every month and the first key $d_1$ and the second key $d_2$ may be determined from the new values of the encoding key $K_e$ and the pairing system key $K_{PS}$. If a person once determines values of two pairs of keys, the person may be able to use a first decoder from a first decoding device with a second smartcard from another receiving decoding system. However, one month later, when the first key $d_1$ and the second key $d_2$ are replaced, the person may have to determine the new values of two pairs of keys. This third alternative embodiments adds more security to the pairing system.

RSA Algorithm

Figure 5:
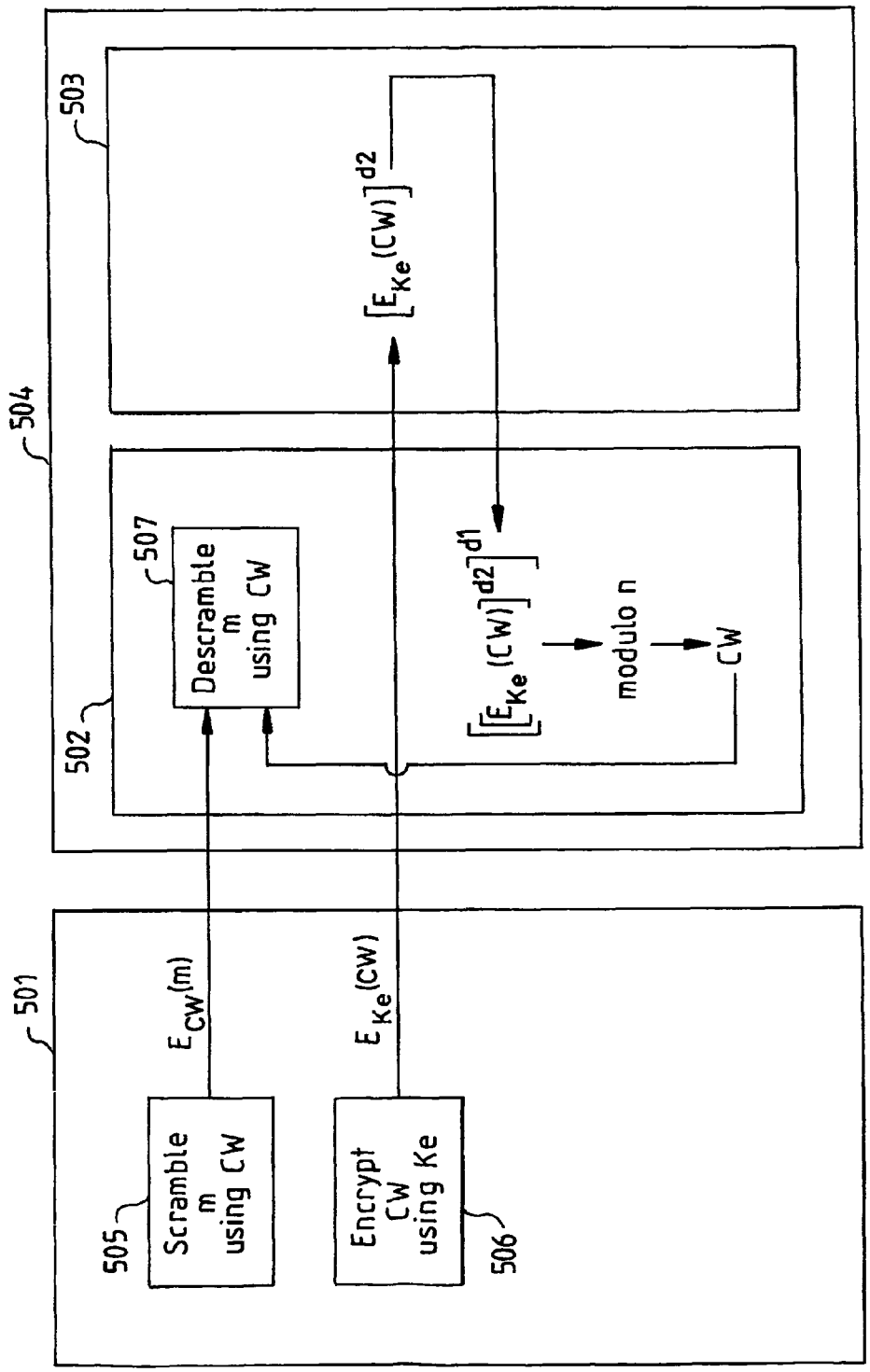
FIG. 5 contains a schematic diagram of a fourth embodiment of the present invention.

In a fourth embodiment, the control data is encrypted using a RSA algorithm FIG. 5 provides a flowchart illustrating the fourth embodiment. The pairing is performed by first selecting a first prime number p and a second prime number q. A modulus number n is calculated as being equal to a product of the first prime number p and the second prime number q:

$$n = p * q$$

An encoding key $K_e$ is then selected from the values of the first prime number p, the second prime number q and the modulus number n, such that:

$$K_e < n \text{ and } K_e \text{ is prime with } \phi(p,q),$$

wherein $\phi(p, q)$ is a function of the first prime number p and the second prime number q such that:

$$\phi(p,q) = (p-1)(q-1)$$

The RSA algorithm is an asymmetric cryptography algorithm. The encoding key $K_e$ is intended to encrypt a control word CW at an encoding system 501. The encoding key $K_e$ is a public key and a pairing system key $K_{PS}$ corresponding to the encoding key $K_e$ may be determined, the pairing system key $K_{PS}$ being a private key distinct from the public key. The pairing system key $K_{PS}$ may be determined as follows:

$$K_{PS} = (1/K_e) \text{ modulo } \phi(p,q)$$

A pair of keys comprising a first key $d_1$ and a second key $d_2$ is selected such that a product of the first key $d_1$ and the second key $d_2$ is congruent to the pairing system key $K_{PS}$:

$$K_{PS} = d_1 * d_2 \text{ modulo } \phi(p,q)$$

The first key may be randomly selected first, and the second key may be determined according to the first key $d_1$, the pairing system key $K_{PS}$ and the function $\phi(p, q)$.

The first prime number p and the second prime number q are not assigned to any apparatus; they are erased so that a person knowing the encoding key $K_e$ and the modulus number n may not be able to decrypt data encrypted with the encoding key $K_e$. The first prime number p and the second prime number q are indeed necessary for determining the pairing system key $K_{PS}$.

The first key may be assigned to a decoder 502, and the second key may be assigned to a smartcard 503. The decoder 502 and the smartcard 503 form a first decoding system 504 among a plurality of receiving decoding systems of a broadcasting network. For each receiving decoding system a distinct pair of keys may be provided.

The pairing is periodically tested. The audiovisual information m is scrambled 505 using the control word CW at the encoding system 501 and continuously transmitted to the plurality of receiving decoding systems. The control word changes every 10 seconds or so.

The encoding system 501 encrypts 506 the control word CW using the encoding key $K_e$ and transmits the encrypted control word to the plurality of receiving decoding systems.

The decoding system 504 receives both the scrambled audiovisual information $E_{CW}(m)$ and the encrypted control word $E_{Ke}(CW)$. The encrypted control word $E_{Ke}(CW)$ may be received at the decoder 502 and may for example be transmitted to the smartcard 503. The smartcard may calculate a first intermediate value $[E_{Ke}(CW)]^{d2}$ being equal or congruent to the encrypted control word $E_{Ke}(CW)$ power the second key $d_2$ and transmit it to the decoder 502. The decoder may receive the first intermediate value $[E_{Ke}(CW)]^{d2}$. A second intermediate value $[[E_{Ke}(CW)]^{d2}]^{d1}$ may be calculated at the decoder as being equal to the first intermediate value $[E_{Ke}(CW)]^{d2}$ power the first key $d_1$. The control word CW is equal to the second intermediate value modulo the modulus number n.

The control word is thus decrypted using the first key at the decoder and using the second key at the smartcard. The scrambled audiovisual information $E_{CW}(m)$ may be descrambled 507 using the control word CW. If the decoder and the smartcard are not correctly paired, i.e. the product of the first key $d_1$ assigned to the decoder and the second key $d_2$ assigned to the smartcard is not congruent to the pairing system key $K_{PS}$, the control word CW is not decrypted and the scrambled audiovisual information is not descrambled.

If a person knows a first pair of keys $(d_{11}, d_{21})$ attributed to a first decoding system, the person is not able in this embodiment to generate all the pairs of keys. Indeed, the function $\phi(p, q)$ has been erased, and the function $\phi(p, q)$ is necessary for determining a pair of keys since the product of the first key $d_{11}$ and the second key $d_{21}$ equals the pairing system key $K_{PS}$ modulo the function $\phi(p, q)$. It is necessary to also know a second pair of keys $(d_{21}, d_{22})$ to determine the function $\phi(p, q)$. The function $\phi(p, q)$ indeed divides a difference $d_{21}*d_{22} - d_{11}*d_{12}$.

In a first alternative embodiment, the decoder receives the encrypted control word $E_{Ke}(CW)$ and performs a first operation: a first alternative intermediate value $[E_{Ke}(CW)]^{d1}$ is calculated as being equal or congruent to the encrypted control word $E_{Ke}(CW)$ power the first key $d_1$. The first alternative intermediate value $[E_{Ke}(CW)]^{d1}$ is transmitted to the smartcard. The second intermediate value $[[E_{Ke}(CW)]^{d2}]^{d1}$ may be calculated at the smartcard as being equal to the first alternative intermediate value $[E_{Ke}(CW)]^{d1}$ power the second key $d_2$. The control word CW is determined from the second intermediate value $[[E_{Ke}(CW)]^{d2}]^{d1}$ and used to descramble the scrambled audiovisual information $E_{CW}(m)$.

In a second alternative embodiment, the first intermediate value is not directly transmitted from the smartcard to the decoder (or from the decoder to the smartcard). The first intermediate value is encoded using a secret key known only by the decoder and the smartcard before being transmitted. An asymmetric cryptography algorithm may also be used for the communication from the smartcard to the decoder.

In a third alternative embodiment, the encoding key $K_e$ and the pair of keys are not directly used for encrypting and decrypting the control word, but an exploitation key. The exploitation key itself allows to encode and decode the control word, the control word allowing to descramble the scrambled audiovisual information. In this third alternative embodiment, the test of the pairing may occur less frequently, e.g. once a month.

Discrete Logarithm Algorithm

Figure 6:
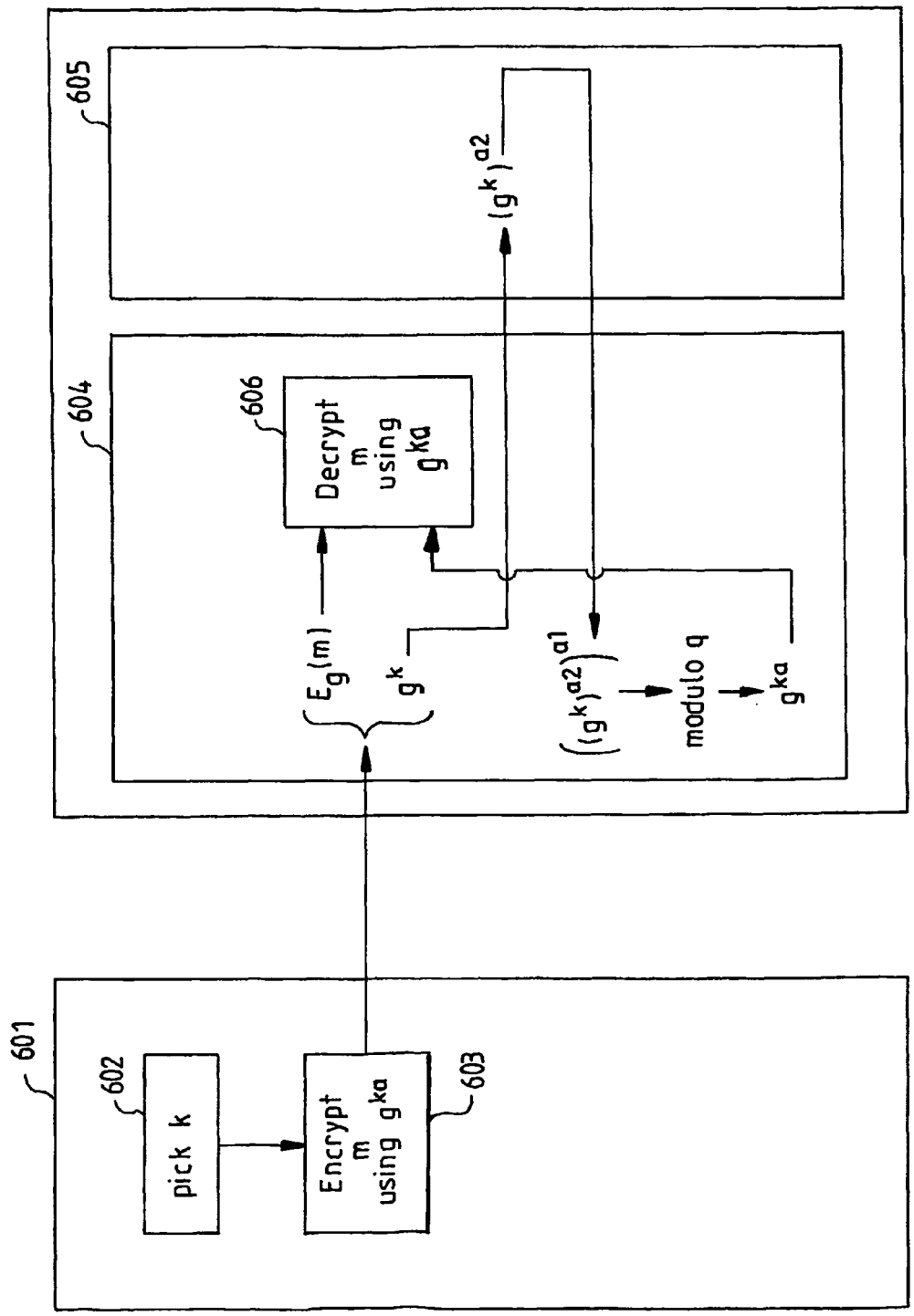
FIG. 6 contains a schematic diagram of a fifth embodiment of the present invention.

In a fifth embodiment, the broadcasted data is encrypted using a discrete logarithm algorithm. FIG. 6 provides a flowchart illustrating the fifth embodiment. The pairing is performed by first selecting a prime number q and a primitive root g of the prime number q. A private key a for communication between an encoding system 601 and any receiving decoding system of a plurality of receiving decoding systems (not represented) is selected and a cession key $g^{ka}$ is calculated as being equal to the primitive root g power a product of the private key a and a random number k, wherein the random number is randomly chosen.

A first key $a_1$ is selected. A second key $a_2$ is determined according to the first key $a_1$, the prime number q and the private key a, such that the product of the first key $a_1$ and the second key $a_2$ is congruent to the private key a modulo the prime number q. The first key $a_1$ and the second key $a_2$ form a pair of keys that is unique in a broadcasting network.

The pairing is periodically tested. The encoding system 601 picks 602 a value of the random number k. An information is encrypted 603 using the cession key. The encoding system 601 transmits to the broadcasting network a message. The message comprises the encrypted information $E_g(m)$ and a partial key $g^k$, the partial key being equal to the primitive root g power the random number k. A decoder 604 receives and transmits to a smartcard 605 the partial key.

The first key $a_1$ and the second key $a_2$ are used to decrypt the encrypted information. The smartcard calculates a first intermediate value $[g^k]^{a2}$, as being equal or congruent to the partial key $g^k$ power the second key $a_2$. The first intermediate value $[g^k]^{a2}$ is then transmitted to the decoder. The decoder calculates a second intermediate value $[[g^k]^{a2}]^{a1}$ as being equal to the first intermediate value $[g^k]^{a2}$ power the first key $a_1$. The cession key may be determined from the second intermediate value as being equal to the second intermediate value modulo the prime number q.

The encrypted information may be decrypted using the cession key.

The information may be an audiovisual information. In this latter case, the first key $a_1$ and the second key $a_2$ are used to decrypt the encrypted audiovisual information via the cession key. The pairing test may occurs frequently, e.g. every 10 seconds.

In a first alternative embodiment, the encrypted information is an encrypted control word, the control word being used to descramble audiovisual information. The first key $a_1$ and the second key $a_2$ are used to decrypt the control word via the cession key. The control word enables to descramble the audiovisual information.

In a second alternative embodiment, the decoder receives the partial key $g^k$ and performs a first operation: a first alternative intermediate value $[g^k]^{a1}$ is calculated as being equal or congruent to the partial key $g^k$ power the first key $a_1$. The first alternative intermediate value $[g^k]^{a1}$ is transmitted to the smartcard. The second intermediate value $[[g^k]^{a2}]^{a1}$ may be calculated at the smartcard as being equal to the first alternative intermediate value $[g^k]^{a1}$ power the second key $a_2$. The cession key $g^{ka}$ is determined from the second intermediate value $[[g^k]^{a2}]^{a1}$ and used to descramble the encrypted information $E_g(m)$.

In a third alternative embodiment, the communicating between the decoder and the smartcard may be encoded with a secret key that is common to the decoder and the smartcard.

In order to increase the security of the system, any or all of the above described embodiments may be implemented in combination with each other.

The present invention is particularly applicable to the transmission of a television broadcast. The present invention also extends to a decoder and security module adapted for descrambling scrambled audiovisual information as described above.

The term "portable security module" is used to mean any conventional chip-based portable card type devices possessing, for example, microprocessor and/or memory storage. This may include smart cards, PCMCIA cards, SIM cards etc. Included in this term are chip devices having alternative physical forms, for example key-shaped devices such as are often used in TV decoder systems.

The terms "scrambled" and "encrypted" and "control word" and "key" have been used here in a number of ways for the purpose of clarity of language. However, it will be understood that no fundamental distinction is to be made between "scrambled data" and "encrypted data" or between a "control word" and a "key".

The term "control data" refers to any data allowing more or less directly to decode an audiovisual information, or the audiovisual information itself.

Similarly, whilst the description refers to "receiver/decoders" and "decoders" it will be understood that the present invention applies equally to embodiments having a receiver integrated with the decoder as to a decoder unit functioning in combination with a physically separate receiver, decoder units incorporating other functionalities, and decoder units integrated with other devices, such as televisions, recording devices etc.

The terms "plurality of decoding systems", or "plurality of decoding systems in a broadcasting network" have been used to mean a high number of decoding systems corresponding to a decoding system subscriber base, typically more than one thousand.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for pairing a decoder and a portable security module in a broadcasting network, comprising:
    selecting a first key, the first key being unique in the broadcasting network and being dedicated to a single device in the broadcasting network;
    assigning the first key to the decoder, wherein the decoder and the portable security module form a first receiving decoding system among a plurality of receiving decoding systems in the broadcasting network, wherein each receiving decoding system is configured to descramble scrambled audiovisual data received via the broadcasting network;
    determining a second key according to the first key, such that a combination of the first key and the second key is congruent to a pairing system key, wherein the pairing system key is common to each receiving decoding system and allows for decryption of encrypted control data, the encrypted control data being identical for each receiving decoding system;
    assigning the second key to the portable security module to obtain a pairing of the decoder and the portable security module;
    wherein the control data enables to descramble the scrambled audiovisual information, the method further comprising:
    receiving, at the first receiving decoding system, the encrypted control data; using the first key at the decoder and using the second key at the portable security module to decrypt the encrypted control data; and
    further comprising respectively attributing the first key and the second key at least to a second decoder and a second portable security module forming a second receiving decoding system from the plurality of receiving decoding systems distinct from the first receiving decoding system.

2. The method according to claim 1, wherein the control data is a control word, the audiovisual information being scrambled using the control word.

3. The method according to claim 1, wherein the control data is an Entitlement Control Message (ECM) comprising a control word, the audiovisual information being scrambled using the control word.

4. The method according to claim 1, wherein the control data is an exploitation key, the exploitation key enabling to decode a control word, the audiovisual information being scrambled using the control word.

5. The method according to claim 1, wherein the control data is an Entitlement Management Message (EMM) comprising an exploitation key enabling to decode a control word, the audiovisual information being scrambled using the control word.

6. The method according to claim 1, wherein the encrypted control data is decrypted using a RSA algorithm, the method further comprising, for the RSA algorithm:
    selecting a first prime number p and a second prime number q;
    calculating a modulus number n as being equal to a product of the first prime number p and the second prime number q;
    selecting an encrypting key e as being smaller to the modulus number and as being prime with a function of the first prime number p and the second prime number q;
    determine a private key as being equal to an inverse of the encrypting key modulus the function of the first prime number p and the second prime number q;
    selecting the first key and the second key such that a product of the first key and the second key equals the private key modulo the function of the first prime number p and the second prime number q;
    erasing the first prime number p and the second prime number q.

7. The method according to claim 6, further comprising:
    receiving, at each of the plurality of receiving decoding systems, a message comprising the encrypted control data;
    decrypting the encrypted control data using the first key at the decoder and the second key at the portable security module.

8. The method according to claim 1, wherein the encrypted control data is decrypted using a discrete logarithm algorithm, the method further comprising, for the discrete logarithm algorithm:

selecting a prime number q; and
selecting a primitive root of the prime number g,
wherein a product of the first key and the second key equals a private key modulo the prime number.

9. The method according to claim 8, further comprising:
receiving, at each of the plurality of receiving decoding systems, a message comprising an encrypted information encrypted with a cession key, the message also comprising the primitive root of the prime number g power a random number k;
using the first key at the decoder and using the second key at the portable security module to calculate the cession key from the prime number power the random number k;
decrypting the encrypted information using the cession key.

10. The method according to claim 9, wherein the encrypted information is the scrambled audiovisual information.

11. The method according to claim 9, wherein the encrypted information is a control word, the audiovisual information being scrambled using the control word.

12. A first receiving decoding system among a plurality of receiving decoding systems in a broadcasting network, each receiving decoding system being adapted to descramble scrambled audiovisual information received over the broadcasting network, the first decoding system comprising:
a decoder to which is assigned a first key, the first key being unique in the broadcasting network and being dedicated to a single device in the broadcasting network; and a portable security module to which is assigned a second key, wherein the decoder and the portable security module form a pairing system,
wherein the second key is determined according to the first key such that a combination of the first key and the second key is congruent to a pairing system key which enables decryption of broadcasted encrypted control data that is received by each receiving decoding system, the encrypted control data being identical for each receiving decoding system;
wherein the control data enables to descramble the scrambled audiovisual information, the method further comprising:
receiving, at the first receiving decoding system, the encrypted control data; using the first key at the decoder and using the second key at the portable security module to decrypt the encrypted control data; and
further comprising respectively attributing the first key and the second key at least to a second decoder and a second portable security module forming a second receiving decoding system from the plurality of receiving decoding systems distinct from the first receiving decoding system.

13. The first decoding system according to claim 12, further comprising:
a receiver for receiving the broadcasted encrypted control data;
a pair of decryptions comprising a first decryption located in the decoder and a second decryption located in the portable security module, wherein the pair of decryptions enables decryption of the broadcasted encrypted control data using the first key and the second key.

14. The first decoding system according to claim 12, wherein the broadcasted encrypted control data is decrypted using a discrete logarithm algorithm.

15. The first decoding system according to claim 12, wherein the broadcasted encrypted control data is decrypted using a RSA algorithm.

16. The first decoding system according to claim 12, wherein the control data is a control word, the audiovisual information being scrambled using the control word.

17. The first decoding system according to claim 12, wherein the control data is an exploitation key, the exploitation key enabling to decode a control word, the audiovisual information being scrambled using the control word.

* * * * *